(12) United States Patent
Chen

(10) Patent No.: US 10,650,142 B1
(45) Date of Patent: May 12, 2020

(54) SYSTEMS AND METHODS FOR DETECTING POTENTIALLY MALICIOUS HARDWARE-RELATED ANOMALIES

(71) Applicant: CA, INC., San Jose, CA (US)

(72) Inventor: Joseph Chen, Los Angeles, CA (US)

(73) Assignee: CA, Inc., San Jose, CA (US)

( * ) Notice: Subject to any disclaimer, the term of this patent is extended or adjusted under 35 U.S.C. 154(b) by 0 days.

(21) Appl. No.: 14/748,261

(22) Filed: Jun. 24, 2015

(51) Int. Cl.
  *H04L 29/06* (2006.01)
  *G06F 21/55* (2013.01)
  *G06F 21/56* (2013.01)

(52) U.S. Cl.
  CPC .......... *G06F 21/552* (2013.01); *G06F 21/566* (2013.01); *G06F 2221/034* (2013.01)

(58) Field of Classification Search
  CPC ............................. G06F 21/552; G06F 21/566
  USPC ........................................................... 726/23
  See application file for complete search history.

(56) References Cited

U.S. PATENT DOCUMENTS

| | | | | |
|---|---|---|---|---|
| 7,024,548 B1* | 4/2006 | O'Toole, Jr. | ........ | H04L 41/0813 709/220 |
| 8,082,585 B1* | 12/2011 | Givonetti | .............. | G06F 21/567 713/188 |
| 8,499,351 B1* | 7/2013 | Fredericksen | .......... | G06F 21/57 709/224 |
| 8,505,103 B2* | 8/2013 | Song | ........................ | G06F 21/53 705/51 |
| 8,910,288 B2* | 12/2014 | Young | ................... | G06F 21/552 713/189 |
| 9,015,838 B1* | 4/2015 | Northup | .................. | H04L 9/005 713/188 |
| 9,241,010 B1* | 1/2016 | Bennett | ............... | H04L 63/1433 |
| 9,401,922 B1* | 7/2016 | Walters | .................... | H04L 63/14 |
| 2006/0095967 A1* | 5/2006 | Durham | .................. | G06F 21/55 726/23 |
| 2007/0033419 A1* | 2/2007 | Kocher | .................... | G06F 21/10 713/193 |
| 2009/0150662 A1* | 6/2009 | Desselle | ................... | G06F 8/65 713/100 |
| 2009/0241192 A1* | 9/2009 | Thomas | ................. | G06F 9/5077 726/23 |
| 2009/0259854 A1* | 10/2009 | Cox | ....................... | G06F 21/575 713/189 |
| 2009/0288167 A1* | 11/2009 | Freericks | ................ | G06F 21/54 726/23 |
| 2009/0319782 A1* | 12/2009 | Lee | ......................... | G06F 21/34 713/156 |

(Continued)

*Primary Examiner* — Jahangir Kabir
(74) *Attorney, Agent, or Firm* — FisherBroyles, LLP (57) ABSTRACT

A computer-implemented method for detecting potentially malicious hardware-related anomalies may include (1) profiling a computing environment of at least one hardware component on a computing device, (2) detecting, by comparing the hardware component's profile with an expected profile for the hardware component, at least one anomaly in the hardware component's computing environment, (3) identifying additional suspicious activity on the computing device, and (4) determining, by correlating the additional suspicious activity on the computing device with the anomaly in the hardware component's computing environment, that the anomaly in the hardware component's computing environment is potentially malicious. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2010/0005531 | A1* | 1/2010 | Largman | G06F 21/53 |
| | | | | 726/24 |
| 2010/0050244 | A1* | 2/2010 | Tarkhanyan | G06F 21/57 |
| | | | | 726/7 |
| 2011/0060947 | A1* | 3/2011 | Song | G06F 21/53 |
| | | | | 714/37 |
| 2012/0054877 | A1* | 3/2012 | Rosu | G06F 9/545 |
| | | | | 726/30 |
| 2013/0067245 | A1* | 3/2013 | Horovitz | G06F 12/1408 |
| | | | | 713/193 |
| 2013/0333033 | A1* | 12/2013 | Khesin | G06F 21/566 |
| | | | | 726/23 |
| 2014/0289852 | A1* | 9/2014 | Evans | G06F 21/55 |
| | | | | 726/23 |
| 2014/0317734 | A1* | 10/2014 | Valencia | G06F 21/552 |
| | | | | 726/22 |
| 2015/0101048 | A1* | 4/2015 | Sridhara | G06F 21/55 |
| | | | | 726/23 |
| 2015/0200934 | A1* | 7/2015 | Naguib | G06F 21/57 |
| | | | | 713/2 |
| 2015/0371036 | A1* | 12/2015 | Warkentin | G06F 21/74 |
| | | | | 726/16 |
| 2016/0098561 | A1* | 4/2016 | Keller | G06F 21/554 |
| | | | | 726/24 |

* cited by examiner

SYSTEMS AND METHODS FOR DETECTING POTENTIALLY MALICIOUS HARDWARE-RELATED ANOMALIES

BACKGROUND

Malware often causes severe disruptions to computing systems by interrupting normal computing operations, deleting data, and/or exposing sensitive information to attackers. Traditionally, computing systems often employ anti-malware software in an attempt to detect, prevent, and/or remove malware and viruses that exploit vulnerabilities in the operating system or other software of a computing system.

Unfortunately, malware developers are increasingly targeting specific aspects of a system's hardware in an attempt to avoid detection by traditional anti-malware solutions. For example, malicious or otherwise compromised firmware installed directly onto the hardware of a computing system may subvert and avoid detection by anti-malware software installed on the computing system. In some cases, these forms of malware may be the result of state-sponsored attacks or direct monitoring of computing systems. In other cases, users may unknowingly introduce this malware onto their system by "jailbreaking" their mobile device or installing custom hardware. Unfortunately, since malicious and/or compromised firmware operates outside of a device's operating system, this form of malware may circumvent traditional security measures and/or expose users to additional attacks. Accordingly, the instant disclosure identifies and addresses a need for additional and improved systems and methods for detecting and/or remediating hardware-related attacks.

SUMMARY

As will be described in greater detail below, the instant disclosure describes various systems and methods for detecting potentially malicious hardware-related anomalies by collecting information about a device's hardware and computing environment in order to identify anomalous differences from an expected computing environment for the device. The system may then correlate identified anomalies with other suspicious activity on the computing device to determine whether the anomalies are malicious.

In one example, a computer-implemented method for detecting potentially malicious hardware-related anomalies may include (1) profiling a computing environment of at least one hardware component on a computing device, (2) detecting, by comparing the hardware component's profile with an expected profile for the hardware component, at least one anomaly in the hardware component's computing environment, (3) identifying additional suspicious activity on the computing device, and (4) determining, by correlating the additional suspicious activity on the computing device with the anomaly in the hardware component's computing environment, that the anomaly in the hardware component's computing environment is potentially malicious.

In one embodiment, profiling the computing environment of the hardware component may include identifying firmware installed on the hardware component, additional hardware associated with the hardware component, software running on the computing device, and/or a network connection of the computing device. In these embodiments, identifying the firmware installed on the hardware component may include identifying the firmware's version number and/or hashing at least a portion of the firmware.

In one embodiment, the expected profile for the hardware component may include a previous computing environment of the hardware component. Additionally or alternatively, the expected profile for the hardware component may include a standard profile for the hardware component constructed from aggregate data of similar hardware components.

In some examples, identifying the additional suspicious activity on the computing device may include determining that the computing device possesses a low hygiene score. In these examples, the hygiene score may include a calculated measure of risk based on prior activity of the computing device. In other examples, identifying the additional suspicious activity on the computing device may additionally or alternatively include identifying malicious activity detailed in an infection report. In these examples, the infection report may include data on malware associated with the computing device and/or data on malware associated with additional computing devices with similar hardware components. Furthermore, in these examples, identifying the additional suspicious activity on the computing device may include identifying, by analyzing the infection report, malware that has re-infected the computing device after having been previously removed.

In some embodiments, correlating the additional suspicious activity on the computing device with the anomaly in the hardware component's computing environment may include identifying at least one common attribute between the additional suspicious activity and the anomaly. In one embodiment, the computer-implemented method may further include, upon determining that the anomaly in the hardware component's computing environment is potentially malicious, notifying a user or administrator of the computing device that the computing environment of the hardware component is potentially malicious. Such embodiments may further include performing a security action in an attempt to remediate the potentially malicious computing environment of the hardware component.

In one example, the computer-implemented method may further include monitoring the computing device for changes in the hardware component's computing environment. In some examples, the computing device may represent a mobile computing device and/or a smart appliance. In further examples, each step may be performed by a hypervisor running on the computing device.

In one embodiment, a system for implementing the above-described method may include (1) a profiling module, stored in memory, that profiles a computing environment of at least one hardware component on a computing device, (2) a detection module, stored in memory, that detects, by comparing the hardware component's profile with an expected profile for the hardware component, at least one anomaly in the hardware component's computing environment, (3) an identification module, stored in memory, that identifies additional suspicious activity on the computing device, and (4) a determination module, stored in memory, that determines, by correlating the additional suspicious activity on the computing device with the anomaly in the hardware component's computing environment, that the anomaly in the hardware component's computing environment is potentially malicious. In addition, the system may include at least one processor that executes the profiling module, the detection module, the identification module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) profile a computing environment of at least one hardware component on the computing device, (2) detect, by comparing the hardware component's profile with an expected profile for the hardware component, at least one anomaly in the hardware component's computing environment, (3) identify additional suspicious activity on the computing device, and (4) determine, by correlating the additional suspicious activity on the computing device with the anomaly in the hardware component's computing environment, that the anomaly in the hardware component's computing environment is potentially malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting potentially malicious hardware-related anomalies. As will be explained in greater detail below, by correlating anomalies in a computing device's hardware computing environment with additional suspicious activity on the computing device, the disclosed systems and methods may be able to determine whether such anomalies are potentially malicious and/or otherwise harmful to the computing device. By doing so, the disclosed systems and methods may be able to detect, prevent, and/or remediate hardware-based attacks that traditional anti-malware solutions are unable to combat.

Figure 1:
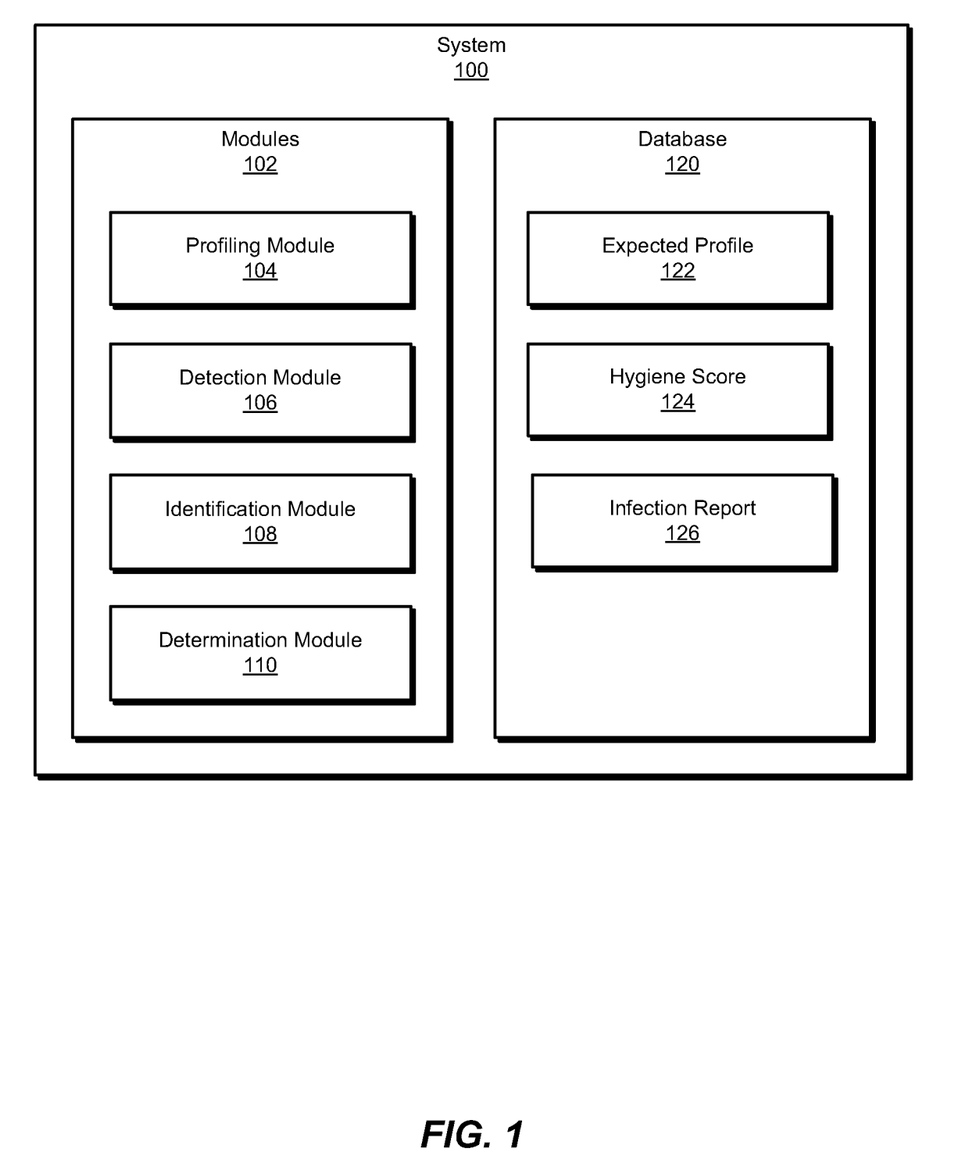
FIG. 1 is a block diagram of an exemplary system for detecting potentially malicious hardware-related anomalies.
Figure 2:
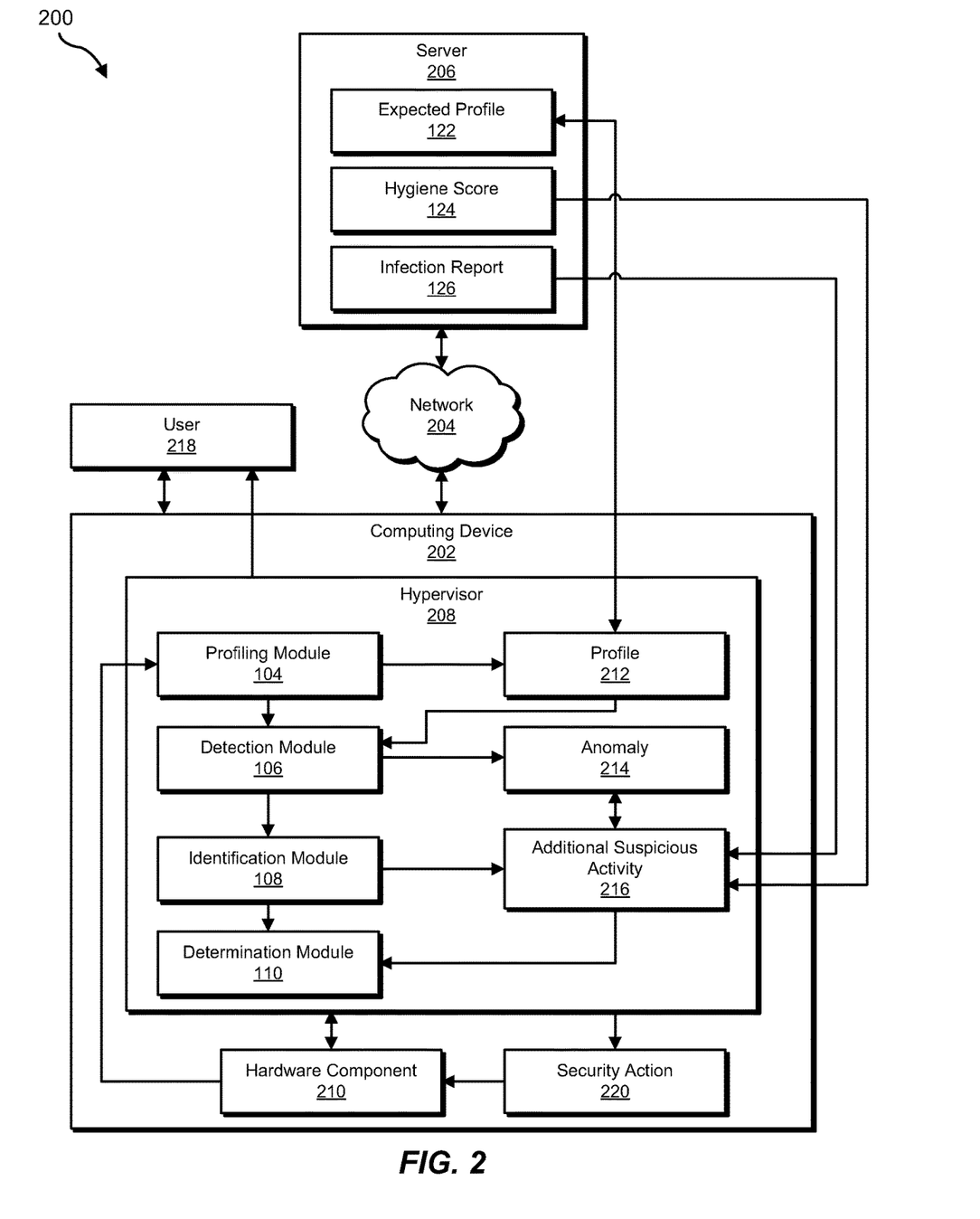
FIG. 2 is a block diagram of an additional exemplary system for detecting potentially malicious hardware-related anomalies.

The following will provide, with reference to FIGS. 1 and 2, detailed descriptions of exemplary systems for detecting potentially malicious hardware-related anomalies. Detailed descriptions of corresponding computer-implemented methods will also be provided in connection with FIG. 3. In addition, detailed descriptions of an exemplary anomaly detected by comparing an exemplary profile with an exemplary expected profile will be provided in connection with FIG. 4. Furthermore, detailed descriptions of exemplary suspicious activity that may be correlated with an exemplary anomaly will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting potentially malicious hardware-related anomalies. As illustrated in this figure, exemplary system 100 may include one or more modules 102 for performing one or more tasks. For example, and as will be explained in greater detail below, exemplary system 100 may include a profiling module 104 that may profile a computing environment of at least one hardware component on the computing device. Exemplary system 100 may additionally include a detection module 106 that may detect, by comparing the hardware component's profile with an expected profile for the hardware component, at least one anomaly in the hardware component's computing environment.

The phrase "computing environment," as used herein, generally refers to any system of interconnected hardware components and software running on those hardware components as part of a computing device or network of computing devices. For example, and as will be described in greater detail below, a computing environment may include, without limitation, firmware installed on a computing device, hardware components of the computing device, software running on the computing device, a network connection of the computing device, and/or combinations of the above. Notably, a hardware component's computing environment may include elements of a computing device that are connected to or utilize the hardware component.

In addition, and as will be described in greater detail below, exemplary system 100 may include an identification module 108 that may identify additional suspicious activity on the computing device. Finally, exemplary system 100 may include a determination module 110 that may determine, by correlating the additional suspicious activity on the computing device with the anomaly in the hardware component's computing environment, that the anomaly in the hardware component's computing environment may be potentially malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2

Figure 6:
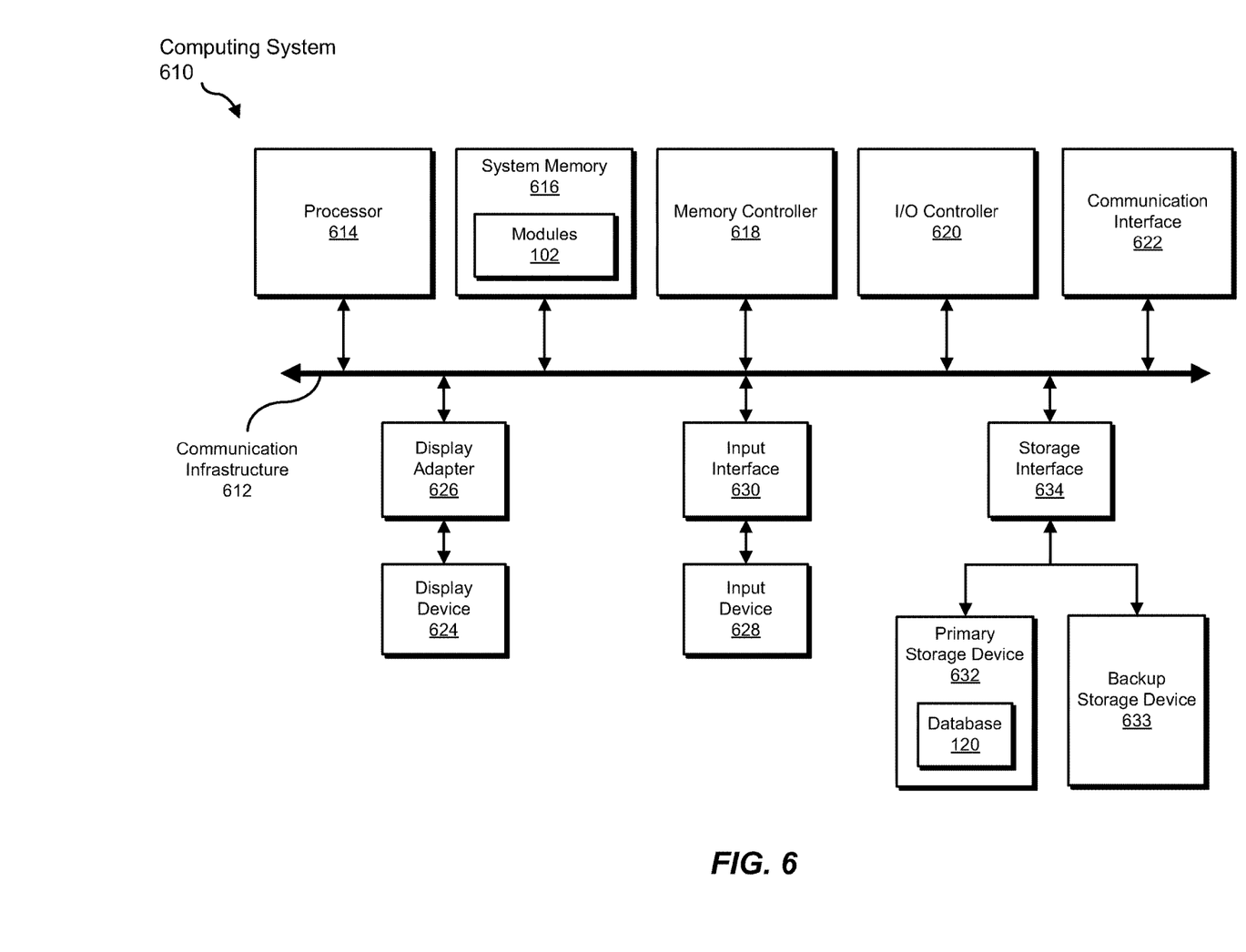
FIG. 6 is a block diagram of an exemplary computing system capable of implementing one or more of the embodiments described and/or illustrated herein.
Figure 7:
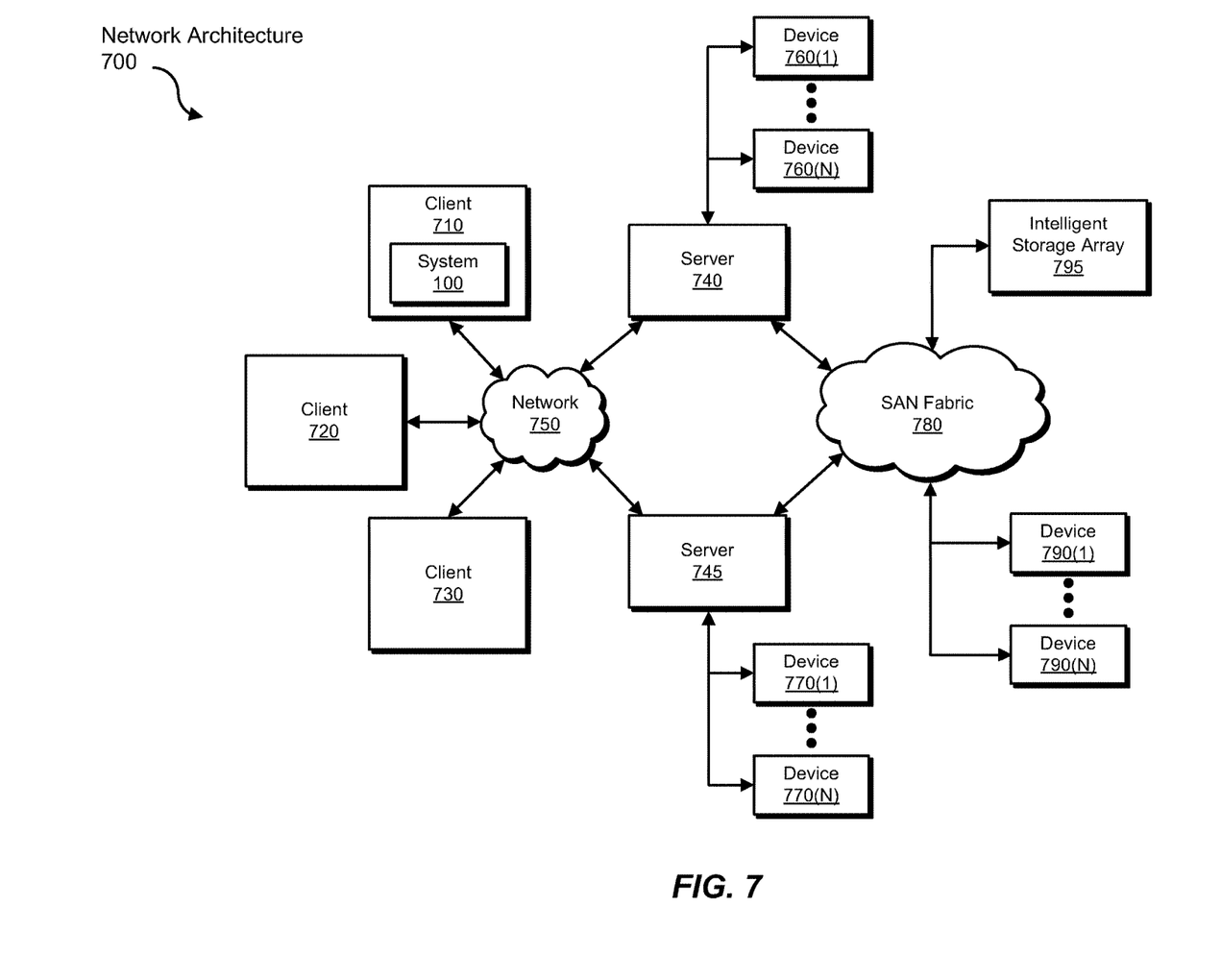
FIG. 7 is a block diagram of an exemplary computing network capable of implementing one or more of the embodiments described and/or illustrated herein.

(e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store an expected profile 122, which may define an expected computing environment for a computing device. Additionally or alternatively, database 120 may be configured to store a hygiene score 124, which may calculate a computing device's security risk. Furthermore, database 120 may be configured to store an infection report 126, which may include information about malware that has been encountered by a computing device.

The term "malware," as used herein, generally refers to malicious software designed to disrupt the functions of computing devices and/or collect sensitive data. In some examples, malware may install itself in software programs, on operating systems or firmware, and/or directly to the read only memory of computing devices. Examples of malware include, without limitation, viruses, Trojans, spyware, worms, rootkits, variations of one or more of the same, combinations of one or more of the same, or any other form of malicious executable code.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to identify potential hardware-related malware. For example, and as will be described in greater detail below, profiling module 104 may profile a computing environment of a hardware component 210 on computing device 202. In this example, detection module 106 may detect, by comparing a profile 212 of hardware component 210 with an expected profile 122 for hardware component 210, an anomaly 214. Identification module 108 may then identify additional suspicious activity 216 on computing device 202. Finally, determination module 110 may determine, by correlating additional suspicious activity 216 on computing device 202 with anomaly 214, that anomaly 214 is potentially malicious.

Computing device 202 generally represents any type or form of computing device capable of reading computer-executable instructions. Examples of computing device 202 include, without limitation, laptops, tablets, desktops, servers, mobile phones, Personal Digital Assistants (PDAs), handheld computing devices, multimedia players, embedded systems, wearable devices (e.g., smart watches, smart glasses, etc.), gaming consoles, exemplary computing system 610 in FIG. 6, or any other suitable computing device. In some embodiments, computing device 202 may also represent a smart appliance. The term "smart appliance," as used herein, generally refers to appliances with computing functions designed to perform specific tasks. Examples of smart appliances include, without limitation, home automation devices (e.g., home security systems, lighting systems, intercom systems, etc.), digitally controlled home appliances, and/or variations or combinations of one or more of the same.

Server 206 generally represents any type or form of computing device that is capable of storing and/or analyzing data about computing device 202. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
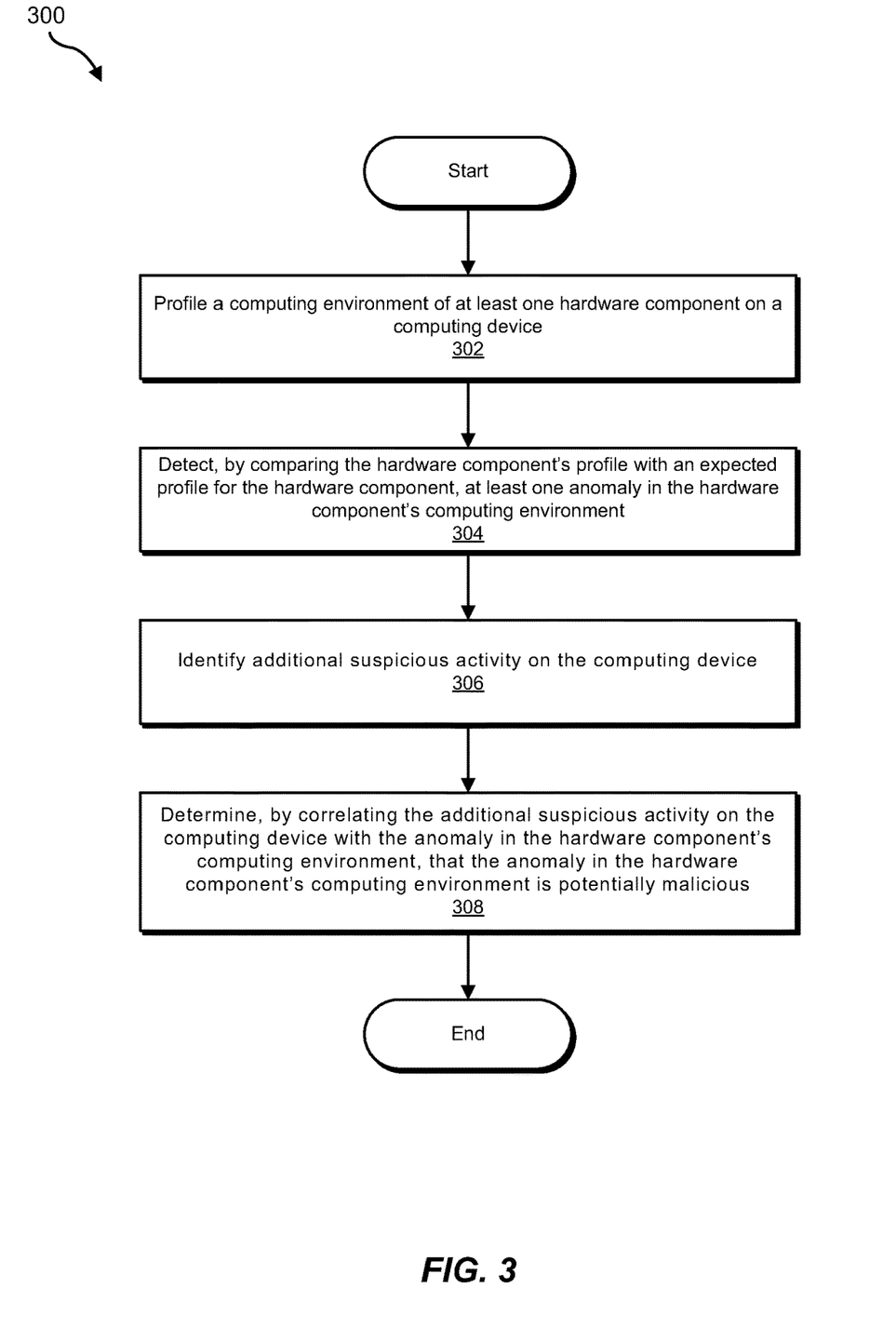
FIG. 3 is a flow diagram of an exemplary method for detecting potentially malicious hardware-related anomalies.

FIG. 3 is a flow diagram of an exemplary computer-implemented method 300 for detecting potentially malicious hardware-related anomalies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may profile a computing environment of at least one hardware component on a computing device. For example, profiling module 104 may, as part of computing device 202 in FIG. 2, profile the computing environment of hardware component 210 on computing device 202.

The term "profile," as used herein, generally refers to any type or form of process that identifies and/or analyzes the components or characteristics of a computing system. In some examples, profiling may be used to detect relationships between the various hardware and/or software components of a computing system. Examples of profiling include, without limitation, detecting peripheral devices connected to a computing system, identifying the operating system installed on a computing system, collecting data on (including, e.g., information about the performance of) software installed on a computing system, identifying and/or testing a computing system's network connection, and/or variations or combinations of one or more of the same.

Profiling module 104 may profile the computing environment of hardware component 210 in a variety of ways. In some examples, profiling module 104 may profile the computing environment of hardware component 210 by identifying firmware installed on hardware component 210, additional hardware associated with hardware component 210 and/or installed on computing device 202, software running on computing device 202, and/or a network connection utilized by computing device 202. For example, in reference to FIG. 2, profiling module 104 may hash or identify the version number (e.g., "1.3") of the firmware installed on hardware component 210, identify the network to which computing device 202 is connected (e.g., "TELNET"), identify additional hardware installed on computing device 202 (e.g., "SD Card Reader"), identify additional software installed on computing device 202 (e.g., "vidplayer.exe"), etc.

As detailed above, in some embodiments profiling module 104 may hash and/or identify the version number of firmware installed on hardware component 210 as part of profile 212. The term "hash," as used herein, generally refers to a process of converting digital data to a fixed value. Notably, hashing may be used to authenticate digital data and/or check the integrity of data against known values. For example, by hashing at least a portion of the firmware installed on hardware component 210, profiling module 104 may confirm that the firmware corresponds to the firmware's expected version number and has not been tampered or changed unexpectedly, thus verifying the legitimacy of the firmware.

Returning to FIG. 3, at step 304, one or more of the systems described herein may detect, by comparing the hardware component's profile with an expected profile for the hardware component, at least one anomaly in the hardware component's computing environment. For example, as part of computing device 202 in FIG. 2, detection module 106 may detect an anomaly 214 in the computing environment of hardware component 210 by comparing profile 212 with expected profile 122.

Detection module 106 may detect anomaly 214 in a variety of ways. In one embodiment, expected profile 122 for hardware component 210 may identify a previous computing environment of hardware component 210. In this embodiment, detection module 106 may detect a change between the previous computing environment and the current computing environment of hardware component 210. In another embodiment, expected profile 122 for hardware component 210 may identify a standard profile for hardware component 210 that is constructed from aggregate data of similar hardware components. In this embodiment, detection module 106 may detect a difference between the standard profile and the actual profile 212 of hardware component 210.

The term "standard profile," as used herein, generally refers to a computing environment that may be common for a particular hardware component and/or computing device. For example, a mobile device with certain hardware may utilize a specific firmware (or firmware version), operating system, software, and/or network connection that is common to the majority of similar devices with the same hardware. A standard profile for the mobile device may then be constructed by polling other mobile devices for information about their firmware, operating systems, network connection, and/or installed software. In another example, expected profile 122 may obtain a standard profile for hardware component 210 by accessing a central database on server 206 that contains information on devices similar to computing device 202.

Figure 4:
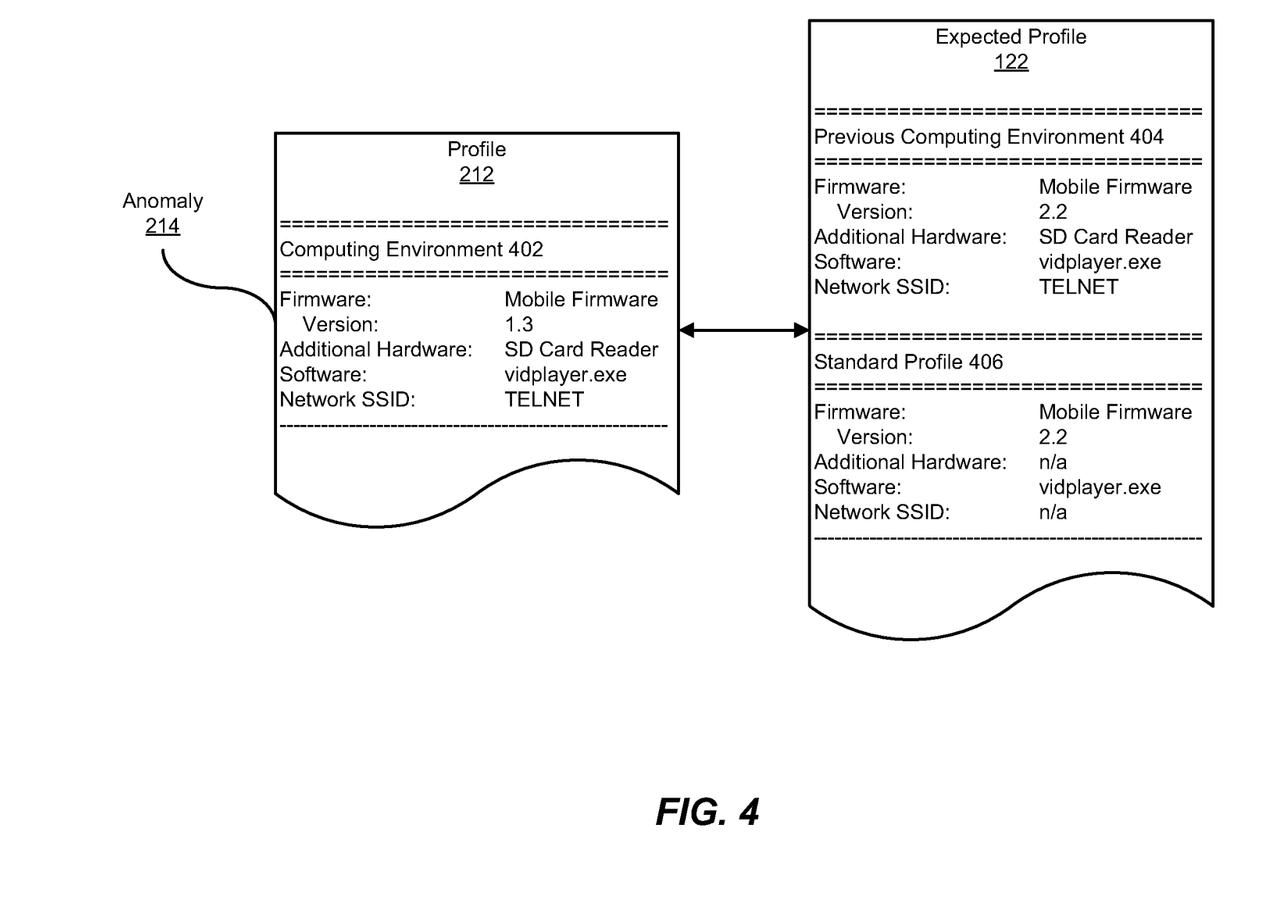
FIG. 4 is an illustration of an exemplary anomaly detected by comparing an exemplary profile with an exemplary expected profile.

As a specific example, in FIG. 4, detection module 106 may detect an anomaly 214 within the profile 212 of a computing environment 402 by comparing profile 212 with an expected profile 122 that is based on a previous computing environment 404 of the hardware component in question and/or a standard profile 406 for the hardware component. As shown in FIG. 4, profile 212 may indicate that the mobile firmware version number of computing environment 402 is "1.3," while expected profile 122 may indicate that the mobile firmware version number of both previous computing environment 404 and standard profile 406 is "2.2." In this example, detection module 106 of FIG. 2 may detect anomaly 214 by comparing the firmware version number of computing environment 402 with the firmware version numbers of previous computing environment 404 and/or standard profile 406. Detection module 106 may also detect anomalies by identifying other differences between a hardware component's profile and its expected profile, such as differences in software configurations and/or versions, firmware hashes or versions, network connections, and/or additional hardware.

Returning to FIG. 3, at step 306, one or more of the systems described herein may identify additional suspicious activity on the computing device. For example, identification module 108 may, as part of computing device 202 in FIG. 2, identify additional suspicious activity 216 on computing device 202.

The phrase "additional suspicious activity," as used herein, generally refers to any activity on a computing device that potentially constitutes abnormal operation of the computing device, including both intentionally malicious and/or unintentionally harmful activities. Examples of additional suspicious activities include, without limitation, unexpected data transfers, installation of unidentified or known-malicious software, unusual user logins, requests for unauthorized access, and/or any other activity that may compromise or harm (either intentionally or unintentionally) a computing device.

Figure 5:
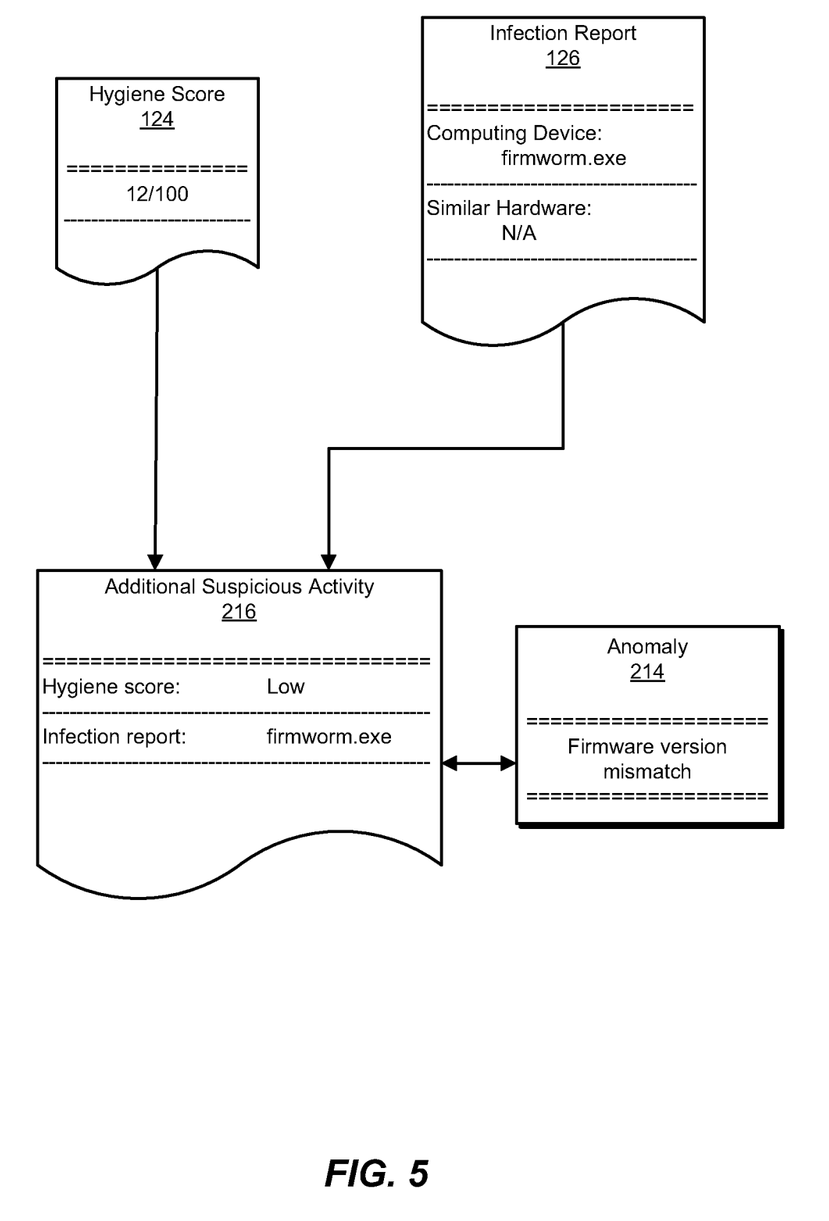
FIG. 5 is an illustration of an exemplary suspicious activity that may be correlated with an exemplary anomaly.

Identification module 108 may identify additional suspicious activity 216 in a variety of ways. In some examples, identification module 108 may identify this additional suspicious activity by directly monitoring (e.g., as part of an anti-malware solution) computing device 202. In other examples, identification module 108 may identify this additional suspicious activity by analyzing data generated by anti-malware solutions. For example, as shown in FIG. 5, identification module 108 of FIG. 2 may determine that computing device 202 possesses a low hygiene score 124 and/or identify malicious activity detailed in an infection report 126 associated with computing device 202 and/or additional computing devices with similar computing environments.

The term "hygiene score," as used herein, generally refers to a measurement of the health and/or security of computing devices. In one embodiment, hygiene score 124 may include a calculated measure of risk based on prior activity of computing device 202. In these embodiments, a low hygiene score may indicate that a computing device represents a high security risk due to previous risky activity performed on and/or by the computing device. In the example of FIG. 5, identification module 108 may determine that computing device 202 possesses a low hygiene score 124 (e.g., "12/100"). In this example, identification module 108 may determine that the low hygiene score 124 of computing device 202 represents additional suspicious activity that warrants further analysis, as explained in greater detail below.

The term "infection report," as used herein, generally refers to information that identifies the security problems of computing devices. In one embodiment, infection report 126 may include data on malware encountered by computing device 202. Additionally or alternatively, infection report 126 may include data on malware encountered by additional computing devices with similar hardware components. For example, and as shown in FIG. 5, infection report 126 may indicate that the firmware of computing device 202 was previously infected (e.g., by the firmware malware "firmworm.exe") while other devices with similar hardware components have no known problems (e.g., "N/A"). In this example, identification module 108 may determine that this previous infection represents additional suspicious activity that warrants further analysis, as explained in greater detail below. Although not illustrated, infection report 126 may also indicate that similar devices may be susceptible to particular malware that also poses a risk for computing device 202.

In some examples, identification module 108 may identify, by analyzing infection report 126, malware (e.g., "firmworm.exe" in FIG. 5) that has re-infected computing device 202 after having been previously removed. In this example, identification module 108 may determine that this re-infection represents additional suspicious activity that warrants further analysis, as explained in greater detail below.

Returning to FIG. 3, at step 308, one or more of the systems described herein may determine, by correlating the additional suspicious activity on the computing device with the anomaly in the hardware component's computing environment, that the anomaly in the hardware component's computing environment is potentially malicious. For example, as part of computing device 202 in FIG. 2, determination module 110 may determine that anomaly 214 is potentially malicious by correlating additional suspicious activity 216 on computing device 202 with anomaly 214.

Determination module 110 may correlate an anomaly with additional suspicious activity on a computing device in a variety of ways. In some examples, determination module 110 may correlate additional suspicious activity 216 on computing device 202 with anomaly 214 by identifying an attribute that is shared between additional suspicious activity 216 and anomaly 214. For example, determination module 110 may determine that anomaly 214 and additional suspicious activity 216 both exhibit firmware-related irregularities since anomaly 214 indicates a "firmware version mismatch" and infection report 126 indicates that computing device 202 was previously infected by the firmware malware "firmworm.exe." In this example, determination module 110 may determine that these shared firmware-related attributes indicate that anomaly 214 is potentially malicious (i.e., determination module 110 may determine that anomaly 214 may have been the cause of, or resulted from, additional suspicious activity 216).

In other examples, determination module 110 may correlate multiple common attributes between additional suspicious activity 216 and anomaly 214 when determining whether anomaly 214 is potentially malicious. For example, in addition to determining that additional suspicious activity 216 and anomaly 214 share firmware-related attributes, determination module 110 may also determine that hygiene score 124 and anomaly 214 are attributed to the same user. In other examples, these common attributes may include accessed data, affected software and/or hardware, network used, etc.

In one embodiment, the above-described method may be performed by a hypervisor running on the computing device. For example, and as illustrated in FIG. 2, a hypervisor 208 may reside on computing device 202 and may execute modules 102. In other examples, hypervisor 208 may run on server 206 and/or independently of computing device 202 and server 206. The term "hypervisor," as used herein, generally refers to any form of software, firmware, and/or hardware that may run and/or monitor virtual machines. In some examples, hypervisor 208 may be installed within an operating system of computing device 202 to monitor multiple virtual machines running on computing device 202. In other examples, hypervisor 208 may be installed directly on the hardware of computing device 202 and may operate independently of the operating system. In either case, by operating at a level close to a computing device's hardware, the disclosed systems and methods may be able to detect malicious anomalies that traditional anti-malware software may be unable to detect.

In some embodiments, one or more of the systems described herein may, upon determining that the anomaly in the hardware component's computing environment is potentially malicious, notify a user or administrator of the computing device of the same. For example, hypervisor 208 may notify a user 218 of computing device 202 that the computing environment of hardware component 210 is potentially malicious due to anomaly 214. In another example, server 206 may notify an administrator of a network of computing devices that include computing device 202 of the potentially malicious computing environment of hardware component 210. In some examples, these notifications may include details about anomaly 214 (e.g., firmware version mismatch, non-standard hardware configuration, unverified software, etc.) and/or additional suspicious activity 216 (e.g., detected malware, unusual user login, low hygiene score, etc.) and may be sent via e-mail, mobile text message, or any other form of communication.

In some examples, the systems described herein may perform a security action 220 in an attempt to remediate the potentially malicious computing environment of hardware component 210. The phrase "security action," as used herein, generally refers to any type or form of attempt to protect the data and/or processes of a computing system. Examples of security actions include, without limitation, isolating the detected anomaly, reporting the anomaly, removing suspected malware, reinstalling affected software, and/or any other action that may repair and/or improve state of security or performance of a computing system. For example, hypervisor 208 may attempt to install the correct firmware on computing device 202 to remedy the anomalous firmware version number identified in anomaly 214 of FIG. 4. In some examples hypervisor 208 may perform security action 220, but in other examples server 206 or computing device 202 may perform security action 220.

In one embodiment, one or more of the systems described herein may monitor the computing device for changes in the hardware component's computing environment. In the example of FIG. 2, hypervisor 208 may monitor computing device 202 for changes in the version of firmware installed on hardware component 210. In other examples, server 206 may monitor computing device 202 for changes in hardware configuration through network 204. In some embodiments, the systems described herein may then detect an anomaly in the changes to the hardware component's computing environment.

As explained above in connection with method 300 in FIG. 3, the disclosed systems and methods may, by correlating anomalies in a computing device's hardware computing environment with additional suspicious activity on the computing device, determine that such anomalies are potentially malicious and harmful to the computing device. Specifically, the disclosed systems and methods may first identify an anomaly in the hardware component's computing environment by identifying a difference between the computing environment and an expected computing environment for the hardware component. For example, the systems and methods described herein may identify a custom firmware rootkit, installed by a user of the computing device, that is not standard and may cause security breaches.

The disclosed systems and methods may then identify additional suspicious activity on the computing device. In the above example, the firmware of the computing device may be sending sensitive data that should not be shared over a network. In this example, the systems and methods disclosed herein may correlate the custom rootkit with the firmware data breach and may label the custom rootkit as potentially malicious.

The disclosed systems and methods may then notify the computing device's user of the potentially malicious anomaly and take steps to resolve the problem. In some examples, the systems and methods described herein may operate as part of a hypervisor monitoring one or more virtual machines running on the computing device. In other examples, the disclosed systems and methods may monitor a network of computing devices and may notify an administrator of the network that one particular computing device is exhibiting a potentially malicious anomaly in comparison to other similar computing devices in the network.

As detailed above, by correlating anomalies in a computing device's hardware computing environment with additional suspicious activity on the computing device, the disclosed systems and methods may be able to determine whether such anomalies are potentially malicious and/or otherwise harmful to the computing device. By doing so, the disclosed systems and methods may be able to detect, prevent, and/or remediate hardware-based attacks that traditional anti-malware solutions are unable to combat. In addition, by operating at a level close to a computing device's hardware (via, e.g., a hypervisor), the disclosed systems and methods may be able to detect malicious anomalies that traditional anti-malware software may be unable to detect.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting potentially malicious hardware-related anomalies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information about an anomaly related to a hardware component's computing environment, transform the information, output a result of the transformation to a hypervisor, use the result of the transformation to determine that the anomaly is potentially malicious, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting potentially malicious hardware-related anomalies, at least a portion of the method being performed by a computing device comprising at least one processor, the method comprising:
    profiling a current computing environment of at least one hardware component on the computing device;
    detecting, by comparing the hardware component's profile with an expected profile for the hardware component, at least one anomaly in the hardware component's current computing environment;
    identifying additional suspicious activity on the computing device that:
        potentially constitutes abnormal operation of the computing device; and
        does not constitute an anomaly in the hardware component's computing environment;
    determining, by correlating the additional suspicious activity on the computing device with the anomaly in the hardware component's current computing environment, that the anomaly in the hardware component's current computing environment is potentially malicious, wherein correlating the additional suspicious activity on the computing device with the anomaly in the hardware component's current computing environment comprises identifying at least one firmware-related attribute in common between the additional suspicious activity and the anomaly that suggests the anomaly is a cause of the additional suspicious activity; and
    upon determining that the anomaly in the hardware component's current computing environment is potentially malicious, performing a security action that remediates the potentially malicious anomaly in the current computing environment of the hardware component and thereby improves a state of security of the computing device.

2. The method of claim 1, wherein profiling the current computing environment of the hardware component comprises identifying at least one of:
firmware installed on the hardware component;
additional hardware associated with the hardware component;
software running on the computing device; and
a network connection of the computing device.

3. The method of claim 2, wherein identifying the firmware installed on the hardware component comprises at least one of:
identifying the firmware's version number; and
hashing at least a portion of the firmware.

4. The method of claim 1, wherein the expected profile for the hardware component comprises at least one of:
a previous computing environment of the hardware component; and
a standard profile for the hardware component constructed from aggregate data of similar hardware components.

5. The method of claim 1, wherein identifying the additional suspicious activity on the computing device comprises at least one of:
determining that the computing device possesses a low hygiene score; and
identifying malicious activity detailed in an infection report.

6. The method of claim 5, wherein the hygiene score comprises a calculated measure of risk based on prior activity of the computing device that indicates the health of the computing device.

7. The method of claim 5, wherein the infection report comprises at least one of:
data on malware associated with the computing device; and
data on malware associated with additional computing devices with similar hardware components.

8. The method of claim 7, wherein identifying the additional suspicious activity on the computing device comprises identifying, by analyzing the infection report, malware that has re-infected the computing device after having been previously removed.

9. The method of claim 1, wherein the firmware-related attribute in common between the additional suspicious activity and the anomaly comprises at least one of:
a user attribute;
accessed data;
affected software;
affected hardware; and
a network attribute.

10. The method of claim 1, further comprising, upon determining that the anomaly in the hardware component's current computing environment is potentially malicious, notifying a user or administrator of the computing device that the current computing environment of the hardware component is potentially malicious.

11. The method of claim 1, further comprising monitoring the computing device for changes in the hardware component's current computing environment.

12. The method of claim 1, wherein the computing device comprises at least one of:
a mobile computing device; and
a smart appliance.

13. The method of claim 1, wherein each step is performed by a hypervisor running on the computing device.

14. A system for detecting potentially malicious hardware-related anomalies, the system comprising:
a profiling module, stored in memory, that profiles a current computing environment of at least one hardware component on a computing device;
a detection module, stored in memory, that detects, by comparing the hardware component's profile with an expected profile for the hardware component, at least one anomaly in the hardware component's current computing environment;
an identification module, stored in memory, that identifies additional suspicious activity on the computing device that:
potentially constitutes abnormal operation of the computing device; and
does not constitute an anomaly in the hardware component's computing environment;
a determination module, stored in memory, that determines, by correlating the additional suspicious activity on the computing device with the anomaly in the hardware component's current computing environment, that the anomaly in the hardware component's current computing environment is potentially malicious, wherein correlating the additional suspicious activity on the computing device with the anomaly in the hardware component's current computing environment comprises identifying at least one firmware-related attribute in common between the additional suspicious activity and the anomaly that suggests the anomaly is a cause of the additional suspicious activity;
a performance module, stored in memory, that, upon determining that the anomaly in the hardware component's current computing environment is potentially malicious, performs a security action that remediates the potentially malicious anomaly in the current computing environment of the hardware component and thereby improves a state of security of the computing device; and
at least one processor that executes the profiling module, the detection module, the identification module, the determination module, and the performance module.

15. The system of claim 14, wherein the profiling module profiles the current computing environment of the hardware component by identifying at least one of:
firmware installed on the hardware component;
additional hardware associated with the hardware component;
software running on the computing device; and
a network connection of the computing device.

16. The system of claim 15, wherein identifying the firmware installed on the hardware component comprises at least one of:
identifying the firmware's version number; and
hashing at least a portion of the firmware.

17. The system of claim 14, wherein the expected profile for the hardware component comprises at least one of:
a previous computing environment of the hardware component; and
a standard profile for the hardware component constructed from aggregate data of similar hardware components.

18. The system of claim 14, wherein the identification module identifies the additional suspicious activity on the computing device by at least one of:
determining that the computing device possesses a low hygiene score; and
identifying malicious activity detailed in an infection report.

19. The system of claim 18, wherein the hygiene score comprises a calculated measure of risk based on prior activity of the computing device that indicates the health of the computing device.

20. A non-transitory computer-readable medium comprising one or more computer-executable instructions that, when executed by at least one processor of a computing device, cause the computing device to:

profile a current computing environment of at least one hardware component on the computing device;

detect, by comparing the hardware component's profile with an expected profile for the hardware component, at least one anomaly in the hardware component's current computing environment;

identify additional suspicious activity on the computing device that:
- potentially constitutes abnormal operation of the computing device; and
- does not constitute an anomaly in the hardware component's computing environment;

determine, by correlating the additional suspicious activity on the computing device with the anomaly in the hardware component's current computing environment, that the anomaly in the hardware component's current computing environment is potentially malicious, wherein correlating the additional suspicious activity on the computing device with the anomaly in the hardware component's current computing environment comprises identifying at least one firmware-related attribute in common between the additional suspicious activity and the anomaly that suggests the anomaly is a cause of the additional suspicious activity; and upon determining that the anomaly in the hardware component's current computing environment is potentially malicious, performing a security action that remediates the potentially malicious anomaly in the current computing environment of the hardware component and thereby improves a state of security of the computing device.

* * * * *